Dec. 31, 1963   P. TROMBETTA   3,115,956
INDUSTRIAL BRAKE
Filed June 8, 1960   3 Sheets-Sheet 1
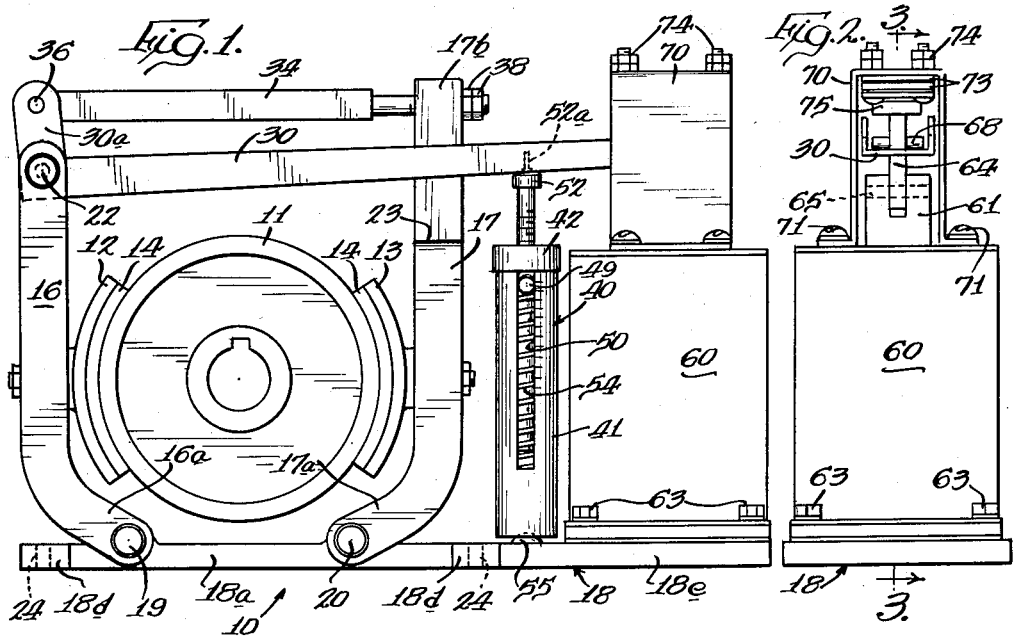
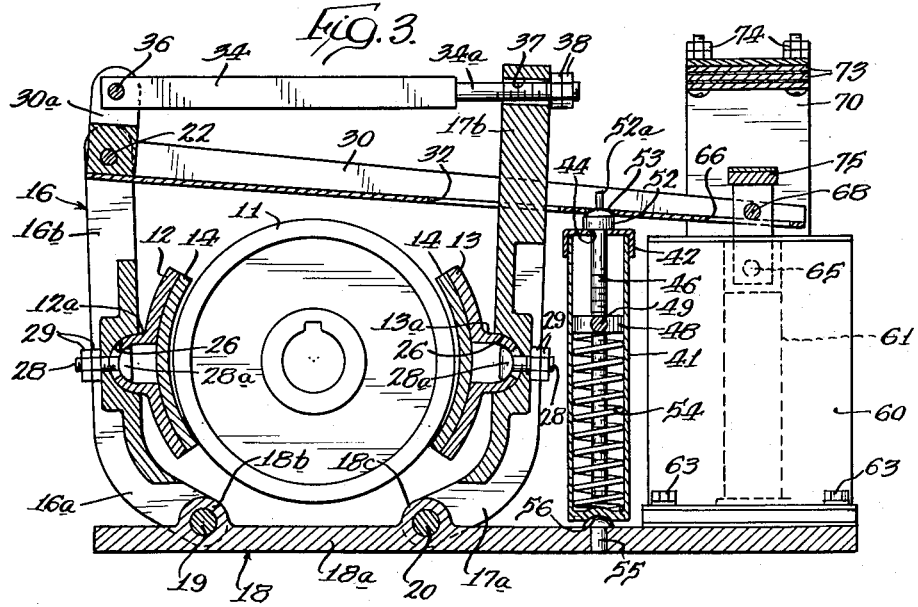
INVENTOR:
Panfilo Trombetta
BY
Mason, Kolehmainen, Rathburn & Wyss
Attys Dec. 31, 1963  P. TROMBETTA  3,115,956
INDUSTRIAL BRAKE
Filed June 8, 1960  3 Sheets-Sheet 2
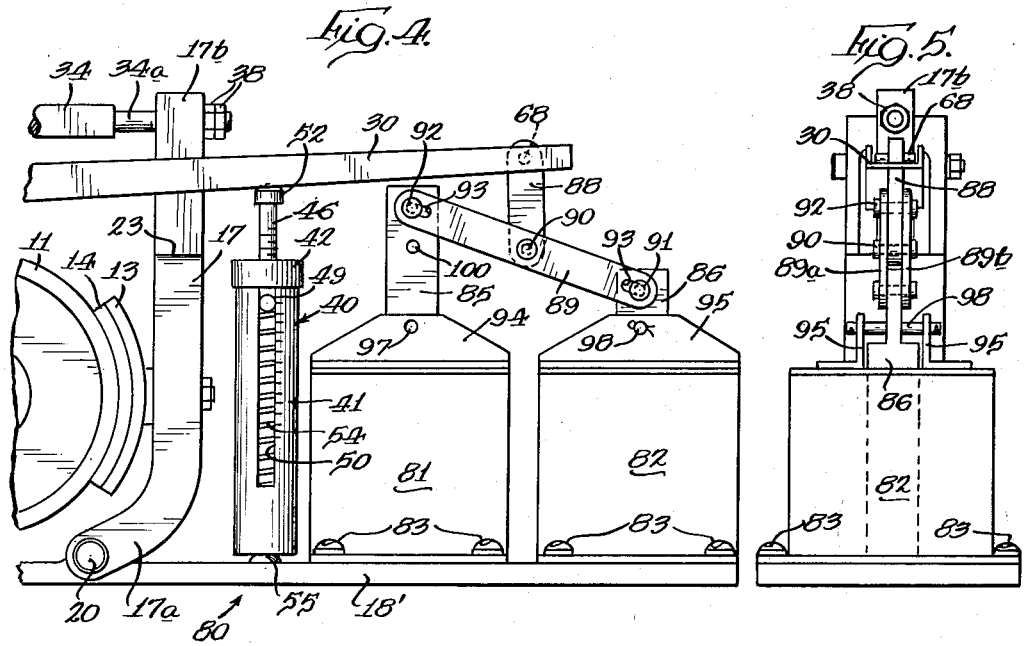
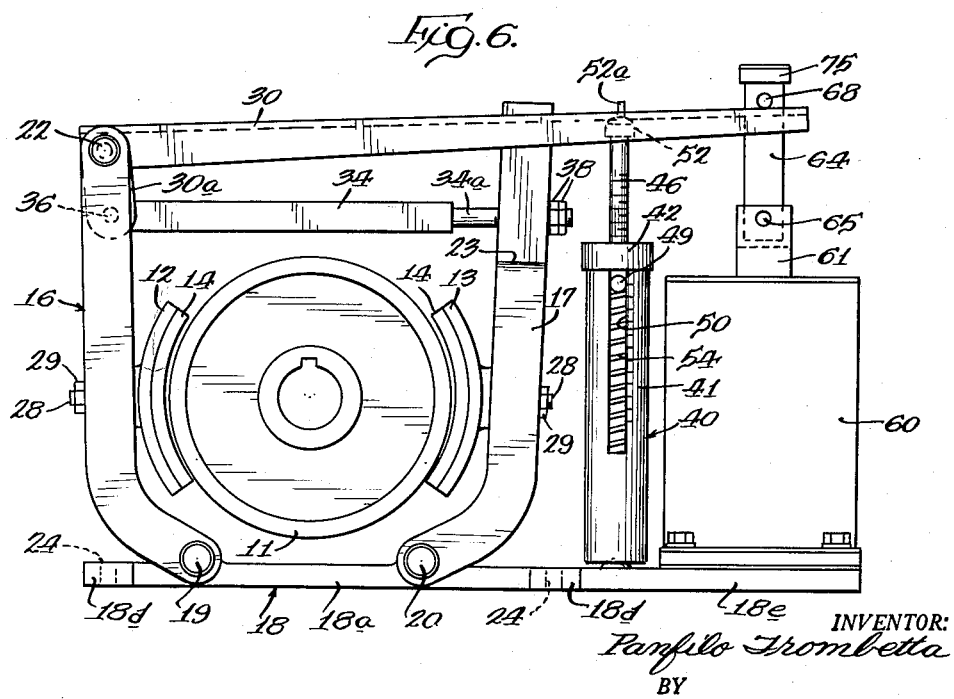
INVENTOR:
Panfilo Trombetta
BY
Mason, Kolehmainen, Rathburn & Wyss
Attys.

Dec. 31, 1963     P. TROMBETTA     3,115,956
INDUSTRIAL BRAKE
Filed June 8, 1960     3 Sheets-Sheet 3
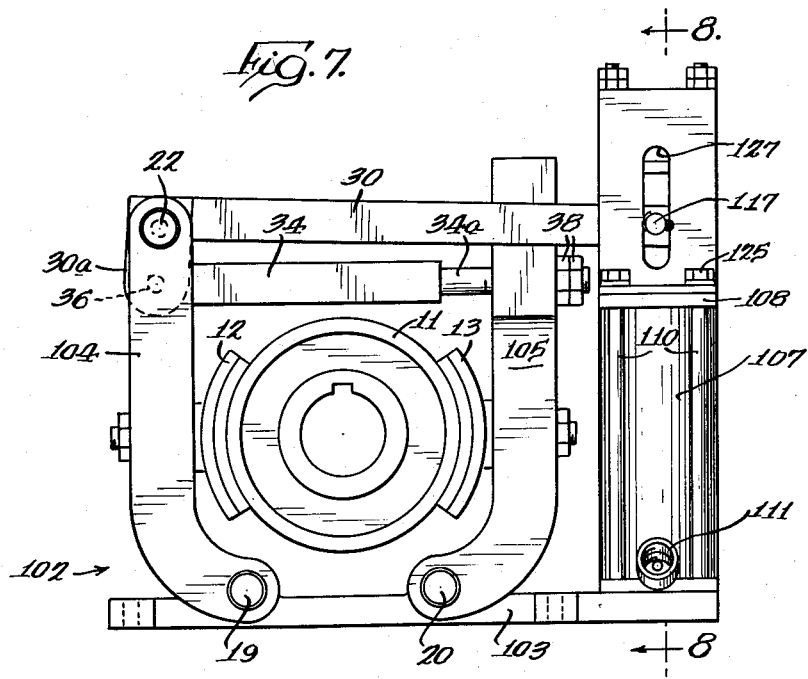
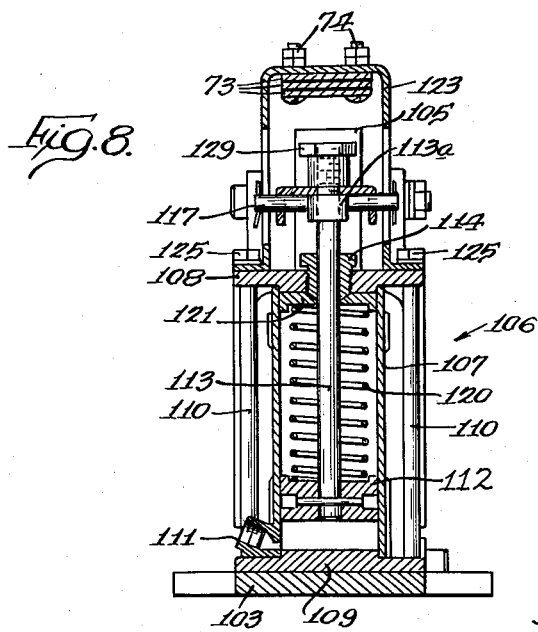
INVENTOR:
Panfilo Trombetta
BY
Mason, Kolehmainen, Rathburn & Wyss
Attys.

United States Patent Office 3,115,956
Patented Dec. 31, 1963

3,115,956
INDUSTRIAL BRAKE
Panfilo Trombetta, 329 N. Milwaukee St.,
Milwaukee 2, Wis.
Filed June 8, 1960, Ser. No. 34,780
5 Claims. (Cl. 188—171)

The present invention relates to industrial brakes and more particularly to automatically controlled brakes wherein the brakes are controlled electromagnetically, pneumatically or hydraulically.

Industrial brakes are of two well known types commonly referred to as spring-set automatically-released, or spring-released automatically-set, the setting or releasing by automatic means being accomplished either electromagnetically, hydraulically, pneumatically or the like.

Automatically controlled brakes are extensively used in industrial applications of all sorts. They are, of course, almost universally employed in connected with elevators, hoists and the like. For such applications the spring-set brake is generally employed in order to make use of its "fail safe" feature. By this is meant that if the automatic means fails, such as electric power in the case of an electromagnetic brake or the source of air or other fluid in the case of hydraulic or pneumatic brakes, then the drive would fail safe since in that event the spring would apply the brake and it would automatically set. In such an application it is clear that a spring-set brake is desirable. There are other applications, however, where automatically-set spring-released brakes are more desirable and applications of this kind are set forth in Trombetta Patent No. 2,693,866, granted November 9, 1954.

Heretofore the construction of spring-set or spring-released brakes has varied widely with resulting increase in manufacturing costs. It would be desirable to provide an arrangement whereby whether the brake be spring-set or spring-released the construction is essentially the same requiring a simple re-arrangement of parts to provide the two quite different types of brakes. It is, of course, desirable that such industrial brakes provide balanced braking forces at all times without requiring the equalizing means which have been essential to many prior art arrangements. It would furthermore be desirable to provide an arrangement where failure of a solenoid winding would not result in a long "shut down."

Accordingly it is an object of the present invention to provide a new and improved automatically controlled industrial brake.

It is a further object of the present invention to provide an industrial brake which with a simple re-arrangement of parts may be either a spring-set or a spring-released type of brake.

It is a further object of the present invention to provide automatically controlled industrial brakes of either the spring-set or spring-released type which may readily be actuated electrically, pneumatically or hydraulically.

Still another object of the present invention resides in the provision of an electromagnetic brake wherein but a momentary shut down occurs when there is a failure of the electromagnet.

Further objects and advantages of the present invention will become apparent as the following description proceeds and the features of novelty which characterize the invention will be pointed out with particularity in the claims annexed to and forming a part of this specification.

For a better understanding of the present invention reference may be had to the accompanying drawings in which:

FIG. 1 is an elevational view of one embodiment of the present invention showing a spring-set electromagnetically-released type of brake with the brake shown in the set condition;

FIG. 2 is a right hand end view of FIG. 1;

FIG. 3 is a sectional view taken substantially on line 3—3 of FIG. 2 but showing the brake in the released condition and the electromagnet in energized condition;

FIG. 4 is a fragmentary elevational view similar to FIG. 1 showing a modification of the arrangement of FIG. 1;

FIG. 5 is a right hand end view of FIG. 4;

FIG. 6 is a view similar to FIG. 1 of another modification of the present invention showing a spring-released electromagnetically-set brake with the brake shown in the released condition;

FIG. 7 is a view similar to FIG. 6 of still another modification of the present invention showing a spring-set pneumatically-released brake with the brake shown in the set condition; and FIG. 8 is a sectional view taken substantially on line 8—8 of FIG. 7.

Briefly the present invention is concerned with a simple industrial brake which may be actuated electrically, pneumatically or hydraulically and which may readily be converted from the spring-set to the spring-release type. The mechanism is simple and compact and provides for adjustment for wear and the like.

Referring now to the drawings and specifically the FIGS. 1, 2 and 3 thereof, there is illustrated an embodiment of the present invention which may be designated as a spring-set electromagnetically-released unit generally indicated by the reference numeral 10. As illustrated this industrial brake comprises the conventional brake drum or brake wheel generally indicated at 11 which is conventionally keyed or otherwise secured to the shaft (not shown) of a suitable device which might be a prime mover such as an electric motor or the like. The prime mover which may be connected to the brake wheel or brake drum 11 may be used to control an elevator, a hoist or other suitable object which it is desired further to control by the industrial brake of the present invention.

For the purpose of frictionally controlling the brake drum or wheel 11, there are provided a pair of brake shoes 12 and 13 which have the conventional concave surfaces conforming to the shape of the periphery of the brake drum 11. Obviously the brake shoes 12 and 13 could have convex surfaces for application to the internal surface of a suitable brake drum. In any event, each brake shoe 12 and 13 is provided with the conventional brake lining designated by the reference numeral 14.

In order to support the brake shoes 12 and 13 in an appropriate position adjacent the brake drum 11 there are provided a front or first brake shoe supporting arm 16 and a rear or second brake shoe supporting arm 17. These brake shoe supporting arms 16 and 17 may comprise castings of suitable material and the lower portions of these shoe arms are substantially identical comprising a pair of curved bifurcations 16a in the case of the brake shoe supporting arm 16, and 17a in the case of the brake shoe supporting arm 17. These bifurcations are adapted to be disposed on opposite sides of a relatively narrow section 18a of a base member 18. Preferably, also the base or base member 18 is provided with raised integral spaced protuberances 18b and 18c for receiving pivot pins 19 and 20. The ends of these pivot pins extend through aligned openings in the bifurcations 16a and 17a of the shoe supporting arms 16 and 17, respectively, whereby these arms are pivotally connected to the base 18 as is clearly shown in FIGS. 1 and 3 of the drawings. The upper portion of the front shoe arm 16 is similarly provided with spaced integrally formed bifurcations 16b and extending between the upper end of the bifurcations 16b is a suitable pivot bolt 22. The rear shoe arm 17 has a relatively narrow upward projection 17b integrally formed with the shoe arm so as to define on either side thereof shoulders 23.

In order that the base 18 may be suitably secured to a support it is provided on either side thereof with laterally projecting lugs 18d (FIG. 1) which have suitable openings 24 therein for fastening means which may extend through these openings and clamp the base 18 to a suitable support. The base 18 includes an extending portion 18e which is somewhat wider than the section 18a for supporting thereon a suitable operating mechanism which may comprise, as will be apparent from the following description, an electromagnet, a pneumatic cylinder or the like.

It will be understood that the brake shoes 12 and 13 should be supported from the shoe supporting arms 16 and 17 in a manner to insure proper centering thereof with respect to the brake drum 11. To this end each of the shoe arms is provided adjacent the lower portion thereof with identical somewhat hemispherical recesses 26 for receiving cooperating hemispherical projections 12a and 13a integrally formed with the brake shoes 12 and 13 respectively as clearly shown in FIG. 3 of the drawings. A suitable brake shoe adjusting stud 28 is provided for each of the brake shoes 12 and 13. These studs 28 are preferably provided with heads 28a having a somewhat hemispherical surface for cooperating with the interior of the hemispherical projections 12a and 13a as clearly shown in FIG. 3 of the drawings. Suitable nuts 29 and, if desired, lock washers may be provided for the studs 28. With this arrangement it will be apparent that the brake shoes 12 and 13 will tend to center themselves relative to the brake drum 11, thereby to apply a uniform frictional force over the entire area of the brake linings 14.

For the purpose of causing relative movement between the shoe supporting arms 16 and 17, there is provided a main lever 30 which is in the form of a channel to one end of which is secured as by welding or the like a U-shaped block 30a. The sides or arms of the U-shaped channel are indicated as tapered from end to end with the widest portion at the end to which block 30a is secured. The bight of the U of the block 30a is preferably welded to the bight portion of the channel so that the arms of the U which in effect define bifurcations extend in the same direction as the tapered sides of the channel-shaped main lever 30. The pin 22 extends through the bight portion of the main lever block 30a and, hence, pivotally mounts the main lever 30 between the bifurcations 16b of the front shoe supporting arm 16. An elongated opening 32 is provided in the bight of the channel-shaped main lever 30 as best shown in FIG. 3 of the drawings to permit the upper portion 17b of the rear shoe supporting arm 17 to extend therethrough. It will be apparent that the main lever block 30a and the main lever 30 together define an L-shaped member with the bifurcations of the main lever block 30a defining the short arm of the L and the main lever portion 30 defining the long arm of the L.

In order to inter-relate the two shoe supporting arms 16 and 17, there is provided a tie bar 34 which has one end thereof disposed between the bifurcations of the main lever block 30a and is pinned thereto by a pivot pin 36. In a device built in accordance with the present invention the main portion of the tie bar 34 was of rectangular cross section, but it included a short integral extension 34a in the form of a bolt extending through an opening 37 in the portion 17b of the rear shoe supporting arm 17. The end of the portion 34a remote from the main section of the tie bar 34 is threaded so as to accommodate suitable nuts such as 38 thereby to adjust the maximum separation between the ends of the shoe supporting arms 16 and 17. It will be apparent that pivotal movement of the main lever 30 in a counterclockwise direction, as viewed in FIG. 3 of the drawings, will, by virtue of tie bar 34, cause the shoe supporting arms 16 and 17 to be moved toward each other and, hence, to apply the brake by causing the brake shoes 12 and 13 to move toward each other and toward the brake drum 11.

In the arrangement shown in FIGS. 1 to 3 of the drawings, a spring-set industrial brake is illustrated. The force for setting the brake is embodied in a self-contained spring unit generally designated by the reference numeral 40 comprising a sort of a cylinder 41 closed at the bottom and open at the top. This cylinder is provided adjacent the open end with an exterior thread so as threadedly to receive a cylinder cover 42 having a suitable opening 44 permitting a piston rod 46 to reciprocate therein along the longitudinal axis of the cylinder 41. A piston-like member 48 is preferably threadedly secured to the piston rod 46 so that it may be adjustably positioned along the longitudinal length thereof. The piston-like member 48 preferably has secured to it a suitable pin 49 which extends through an elongated opening 50 defined in the cylinder 41. This pin 49 prevents rotation of the piston-like member 48, thereby permitting one to adjust the position of the piston-like member 48 along the longitudinal axis of the rod 46 by merely rotating rod 46. The end of the rod 46 extending outside the cylinder 41 is provided with a head 52 which may be square or hexagonal so that it may be adjusted by suitable wrench thereby controlling the position of the piston-like member 48 along the piston rod 46. A suitable projection 52a from the head 52 extends into a cooperating opening 53 defined in the main lever 30 as clearly shown in FIG. 3 of the drawings. A suitable coiled compression spring 54 is disposed within cylinder 41 between the closed bottom and the piston-like member 48, thereby continuously biasing piston rod 46 upwardly, as viewed in FIGS. 1 and 2 of the drawings.

For the purpose of mounting the spring unit 40 on the base 18 so as to apply a brake setting force to the main lever 30, there is secured to the base 18 a spherically headed rivet 55, the spherical head of which is receivable in a cooperating spherical recess 56 defined on the exterior of the closed bottom of the cylinder 41. With this arrangement the spring unit 40 is free to perform its function and can readily be inserted or removed as a unit. When the spring unit 40 is in the position shown in FIG. 1 of the drawings and no other force is applied to the main lever 30, it will cause this lever to pivot in a counterclockwise direction about pivot pin 22 with the result that the brake is applied to the brake drum 11. By virtue of the arrangement of the shoe supporting arms 16 and 17, the braking force is applied without any unbalanced forces and without the requirement of any equalizer means. By virtue of the adjustment between the piston-like member 48 and the rod 46 the force of the spring for setting the brake can be adjusted to any desired value within prescribed limits. Furthermore, by adjusting the nuts 38 the prescribed clearance between the brake shoes and the brake drum can be obtained. It should be understood that the clearance shown in FIG. 3 of the drawings is greatly exaggerated in order better to illustrate the operation of the device.

To automatically release the brake, any suitable device may be mounted on the extension 18e of the base 18 which when actuated will cause clockwise movement of the lever arm 30 about the pivot pin 22 as viewed in FIGS. 1 and 3 of the drawings against the force of spring unit 40. As illustrated in FIGS. 1 to 3 of the drawings, there is provided an electromagnetic operating unit generally designated by the reference numeral 60 which may be any well known solenoid having the conventional winding (not shown) and a movable plunger 61 shown in FIGS. 2 and 3 of the drawings. This electromagnet 60 is preferably secured to the base 16e as by suitable fastening means 63. The particular construction of the electromagnet 60 forms no part of the present invention and the plunger or armature 61 is shown merely to show how it is operatively connected to the main lever 30.

As illustrated in the drawings, the upper end of plunger 61 is bifurcated so as to receive between the bifurcations a clevis link 64 pivotally connected as by a pin 65 to the armature or plunger 61. As illustrated, this clevis link extends through an opening 66 defined in the bight portion of the channel-shaped main lever 30. A pin 68 extending through the clevis link 64 above the bight portion of the channel-shaped main lever 30 then insures that the downward force applied to the clevis link 64 will cause pivotal movement of the main lever 30 against the spring unit 40.

It will be appreciated that the compression spring 54 embodied in the spring unit 40 will cause the main lever 30 to move with great speed when the solenoid unit 60 is deenergized. In order to cushion the upward movement of arm 30, there is provided a U-shaped shock absorber support 70 which is secured by means of the screws 71 extending through lateral flanges on the support 70. These screws threadedly engage a portion of the housing of electromagnet unit 60. Supported from the bight of the U-shaped bracket 70 on the inside thereof are alternate layers of leather and metal plates generally designated at 73 which are fastened to the support 70 by the fastening means 74. These layers define a bumper or stop engageable by a bumper generally designated at 75 secured to the top of the clevis link 64 where it projects above the main lever 30. It will be apparent that upon de-energization of the winding of the electromagnet 60 the bumper portion 75 actuated by the force of compression spring 54 will strike the shock absorber 70 and cushion the operation thereof.

In view of the detailed description set forth above, the operation of the industrial brake disclosed in FIGS. 1 to 3 will readily be understood and no further discussion is included herewith. With this arrangement the entire brake mechanism including the shoe supporting arms 16 and 17 and the main lever 30 are completely free to adjust themselves so that the brake shoes 12 and 13 will uniformly engage the brake drum 11 without interference from external reactions.

In FIGS. 4 and 5 of the drawings there is illustrated a modification of the present invention in which all parts except the electromagnet are the same, and these parts are designated by the same reference numerals as in the preceding drawings. This mechanism is designated by the reference numeral 80 and comprises a base 18' which may be identical with the preceding base 18, but preferably includes an extension to support two electromagnets designated as 81 and 82, respectively. These electromagnets are suitably secured as by fastening means 83 to the base 18'. Each electromagnet is provided with the conventional solenoid winding, not shown, and movable plungers designated as 85 and 86 for the solenoids 81 and 82, respectively. In accordance with the present invention, the free end of main lever 30 is connected to the solenoid plungers 85 and 86 by means of a clevis 88 and a lever 89. The upper end of the clevis 88 extends through the opening 66 in the lever arm 30, and the pin 68 described in connection with FIGS. 1 to 3 of the drawings functions in the same manner as it did in FIGS. 1 to 3 to secure this clevis to the main lever 30. The lower end of the clevis 88 is connected as by pivot pin 90 to substantially the midpoint of the lever 89, which, as is best shown in FIG. 5 of the drawings, comprises two arms 89a and 89b. One end of lever 89 is pinned to the upper end of plunger 86 of solenoid 82 as by pivot pin 91, and the other end of lever 89 is pivotally connected to the upper end of solenoid plunger 85 of solenoid 81 by pivot pin 92. Preferably, pivot pins 91 and 92 extend through elongated openings 93 in lever 89 to prevent any binding during operation thereof.

It is intended with the arrangement disclosed in FIGS. 4 and 5 that only one of the solenoids 81 or 82 will be operated at any time, and the other will, in effect, comprise a spare. To render the spare solenoid inoperative, aside from the fact that the winding thereof will not be energized, each of the electromagnets 81 and 82 is provided with a pair of L-shaped brackets, 94 in the case of solenoid 81 and 95 in the case of solenoid or electromagnet 82. These brackets are secured to the upper end of the associated housing of the solenoid or electromagnet, one on either side of the associated plunger such as 85 or 86. Moreover, these brackets are provided with aligned openings 97 for receiving a pin 98, which pin also extends through a cooperating opening 100 defined in the plunger of the associated solenoid such as plungers 85 and 86. Thus, this pin 98, which in FIGS. 4 and 5 of the drawings is utilized with electromagnet 82, locks the electromagnet in an inoperative condition, and pin 91 then becomes a fixed pivot pin for the lever 89. Upon energization of the winding of electromagnet 81, it will be apparent that lever 89 will move in a counterclockwise direction about pivot pin 91, as viewed in FIG. 4 of the drawings, thus releasing the brake.

Should the winding of solenoid 81 burn out for any reason or should the solenoid otherwise become defective, all that is necessary is to remove pin 98 from the brackets 95 and apply it to the brackets 94 so that it extends through the openings 97 in these brackets and the opening 100 in plunger 85. Of course, the winding of solenoid 82 must be connected in circuit in place of the winding 81. With this simple change, the brake continues to be completely operative and replacement parts for electromagnet 81 can then be ordered without incapacitating the device. The operation of the arrangement shown in FIG. 4 will be completely apparent in view of the preceding description. It, again, is a spring-set electromagnetically-released industrial brake.

An important feature of the present invention resides in the fact that with the same parts the apparatus can readily be converted from a spring-set electromagnetically-released brake to a spring-released electromagnetically-set brake. In FIG. 6 of the drawings there is illustrated how the brake of FIG. 1 with the same parts may be converted from a spring-set to a spring-released brake. The corresponding parts of FIG. 6 are designated by the same reference numerals as in FIG. 1. Essentially, all parts are identical except that the bumper bracket 70 has been omitted in FIG. 6. Effectively, the only difference is the reversal of the main lever 30, which is inverted so that the bifurcations formed by the U-shaped block 30a extend downwardly between the bifurcations 16b of the shoe supporting arm 16 instead of upwardly, as shown in FIGS. 1 and 3 of the drawings. Additionally, the shoe supporting arm 17 is provided with an opening for the portion 34a of the tie bar 34, which is nearer the shoulder 23 than was the case in FIG. 1. With this simple reversal of the parts it is apparent that the spring unit 40 now acts to release the brake and energization of electromagnet 60 tends to apply the brake. Thus, a purchaser may buy a single unit and it can be used either as a spring-set or a spring-released brake.

It will be understood that although the automatic means employed in connection with the brakes described thus far were electromagnets, other operating means could similarly be employed. For example, hydraulic or pneumatic cylinders could be employed for the same purpose. In FIGS. 7 and 8 of the drawings there is illustrated a spring-set pneumatically-released brake in which the spring means has been incorporated in the pneumatic operating unit. Referring now to FIGS. 7 and 8, there is illustrated an industrial brake unit generally designated by the reference numeral 102 comprising a base 103 to which are pivotally mounted shoe supporting arms 104 and 105 which may be substantially identical with the arms 16 and 17, respectively, of FIG. 6 of the drawings. These arms are pivotally supported to the base 103 by the pivot pins 19 and 20. The main lever 30 and the tie bar 34 are preferably arranged in exactly the same manner as in FIG. 6. In accordance with the present invention there is supported on the base 103 adjacent the shoe supporting arm 105 a combined pneumatic and spring unit generally designated at 106. As best shown in FIG. 8, this unit comprises a cylinder 107 whose upper and lower ends are closed by end closure plates 108 and 109, respectively, clamped to the cylinder by tie bolts 110. Reciprocally mounted within cylinder 107 is a piston 112. The piston 112 is illustrated as being in its lowermost position adjacent the end closure plate 109, and a suitable air inlet opening 111 is provided to supply air under pressure for causing movement of the piston 112 in cylinder 107. In order to transfer movement of the piston 112 to movement of the main lever 30, there is provided a piston rod 113 which extends through a suitable adjustable bushing 114 threadedly mounted in an end closure plate 108. The upper end of the piston rod 113 is provided with an enlargement 113a through which a pivot pin 117 extends, said pivot pin being disposed below the bight portion of U-shaped lever 30 and extending through suitable elongated openings in the sides of this lever 30. It will be apparent that when air is supplied through inlet opening 111, the right hand end of lever 30 connected to connecting rod 113 is moved upwardly to release the brake.

For the purpose of setting the brake, there is provided a coiled compression spring 120, which is mounted within the cylinder 107 and is concentrically disposed with respect to the connecting rod 113. The lower end of this spring, as illustrated in FIG. 8, engages the piston 112, and the upper end thereof engages an adjustable spring cup 121. The particular adjustment of this spring cup within cylinder 107 determines the force applied to set the brakes and which may be adjusted within prescribed limits. Preferably, this adjustment is accomplished by adjusting the bushing 114.

In order to cushion the release motion of the mechanism in response to pneumatic pressure, there is provided a stop mechanism in the form of a U-shaped bracket 123, very similar to the bracket 70 described earlier herein. This bracket is secured to the top of unit 106 preferably by the tie bolts 110 which also hold the pneumatic cylinder and end plates in assembled relationship. The stop bracket 123 is U-shaped and is provided on either arm of the U with a guide slot 127 into which the ends of the pin 117 extend. As shown in FIG. 8 of the drawings, the U-shaped support 123 supports alternate layers of leather and steel, indicated at 73, as by fastening means 74, to define a cushion or bumper, and a corresponding bumper 129 may be supported above lever 30 to engage the bumper 73. With this arrangement it will be apparent that the unit 106 performs the functions of both the electromagnet 60 and the spring unit 40 described in connection with FIG. 1. It will also be appreciated that the unit 106, instead of being a pneumatic unit, could equally well be a hydraulic unit of some sort. Furthermore, instead of being spring-set and automatically-released, an arrangement similar to that of FIG. 6 could be employed.

While there have been shown and described several embodiments of the present invention, it will be apparent to those skilled in the art that various changes and modifications may be made without departing from the invention in its broader aspects, and it is, therefore, contemplated in the appended claims to cover all such changes and modifications as fall within the true spirit and scope of the invention.

What is claimed as new and desired to be secured by Letters Patent of the United States is:

1. In a friction brake of the type comprising a base, brake shoe means movable relative to said base, a brake drum associated with said brake shoe means, a lever operatively connected to said brake shoe means for producing predetermined movement thereof relative to said brake drum in response to movement of said lever, electromagnetic means operatively connected to said lever comprising two solenoids each having a movable plunger, a member interconnecting said plungers, a link connecting said lever to said member, and means for selectively locking one of said plungers in a fixed position.

2. A friction brake comprising a base, a brake drum, a pair of brake shoes capable of engagement with said brake drum, means for supporting said brake shoes on opposite sides of said drum comprising first and second shoe supporting members, each having a corresponding end thereof pivoted to said base, an L-shaped lever having a relatively short arm and a relatively long arm, means selectively interconnecting the junction point of the two said arms pivotally to the other end of said first shoe supporting member with said lever selectively mountable in a first position with said short arm extending in a first direction to define one type of brake and selectively in a second direction to define a different type of brake by the mere reversal thereof on said first shoe supporting member, a link interconnecting the end of said short arm and said second member, and spring brake operator means connected to said long arm of said L-shaped lever.

3. A friction brake comprising a base, a pair of brake shoe supporting arms, each having one end pivotally connected to said base, a brake shoe mounted on each of said arms, a brake drum between said brake shoes, a bell crank having an intermediate point thereof pivoted to the other end of said arms, a tie bar having one end pivotally connected to one end of said bell crank and said other end connected to said other end of said arms, spring means for biasing said bell crank in a predetermined direction with respect to its pivotal support on one end of said arm, electromagnetic means for selectively applying a force to said bell crank in opposition to the force produced by said spring means and including a pair of solenoids supported from said base, each of said solenoids including a plunger, a lever interconnecting said plungers, a link interconnecting an intermediate point on said lever with the other end of said bell crank, and means for preventing one of said plungers from moving upon energization of said electromagnetic means.

4. An operating mechanism for operating the brake shoes of a friction brake comprising a base, a pair of brake shoe supporting arms each having one end pivotally connected to said base, a brake shoe mounted on each of said arms, a bell crank including a long arm and a short arm pivoted at the junction of said two last-mentioned arms to the other end of one of said first-mentioned arms, a tie bar having one end pivotally connected to said short arm of said bell crank and the other end connected to the other of said first-mentioned arms, spring actuating means including a cylinder, spring means within said cylinder, a pistonlike means within said cylinder biased by said spring means, a piston rod engaging said bell crank and threaded adjustably through said pistonlike means, cooperating means between said cylinder and said pistonlike means holding said pistonlike means against rotation providing for adjustment of the force produced by said spring means upon rotating said piston rod relative to said pistonlike means, the lower end of said cylinder being pivotally supported on said base, said spring actuating means biasing said bell crank in a predetermined direction with respect to its pivotal support on one end of said one of said first-mentioned arms, and controllable means independent of said actuating spring means for selectively applying a force to said long arm of said bell crank in opposition to the force produced by said spring means.

5. An operating mechanism for operating the brake shoes of a friction brake comprising a base, a pair of brake shoe supporting arms each having one end pivotally connected to said base, a brake shoe mounted on each of said arms, a bell crank including a long arm and a short arm pivoted at the junction of said two last-mentioned arms to the other end of one of said first-mentioned arms, a tie bar having one end pivotally connected to said short arm of said bell crank and said other end connected to the said other of said first-mentioned arms, means for selectively pivotally mounting said bell crank relative to said one of said first-mentioned arms in a first position to provide a spring-set automatically-released brake and in a second position by the reversal thereof to provide a spring-released automatically-set brake, actuating spring means operatively associated with the long arm of said bell crank and connected to bias said bell crank in a predetermined direction with respect to its pivotal support on one end of said one of said first-mentioned arms and controllable means independent of said actuating spring means for selectively applying a force to said long arm of said bell crank in opposition to the force produced by said spring means.

References Cited in the file of this patent

UNITED STATES PATENTS

| | | |
|---|---|---|
| 663,597 | Behr | Dec. 11, 1900 |
| 1,282,483 | Steen | Oct. 22, 1918 |
| 1,489,518 | Bliss | Apr. 8, 1024 |
| 1,563,544 | Atkinson | Dec. 1, 1925 |
| 1,791,896 | Henning | Feb. 10, 1931 |
| 2,009,120 | Price | July 23, 1935 |
| 2,085,040 | Post | June 29, 1937 |
| 2,322,335 | Anderson | June 22, 1943 |
| 2,693,866 | Trombetta | Nov. 9, 1954 |

FOREIGN PATENTS

| | | |
|---|---|---|
| 897,400 | France | May 22, 1944 |